Aug. 31, 1926.

F. M. PRICE

GLARESHIELD

Filed July 23, 1924

1,598,010

F. M. Price
INVENTOR

BY Victor J. Evans
ATTORNEY

WITNESS:

Patented Aug. 31, 1926.

1,598,010

UNITED STATES PATENT OFFICE.

FRANK M. PRICE, OF MEMPHIS, TENNESSEE.

GLARESHIELD.

Application filed July 23, 1924. Serial No. 727,778.

My present invention has reference to a glare shield for automobiles.

My object is the provision, in a device of this character, of simple means whereby a glare shield may be adjustably supported from the top or side of a windshield, and wherein the glare shield may be arranged at any desired angle to protect the vision of the driver of the machine.

The drawing illustrates the improvement, and wherein:—

Figure 1:
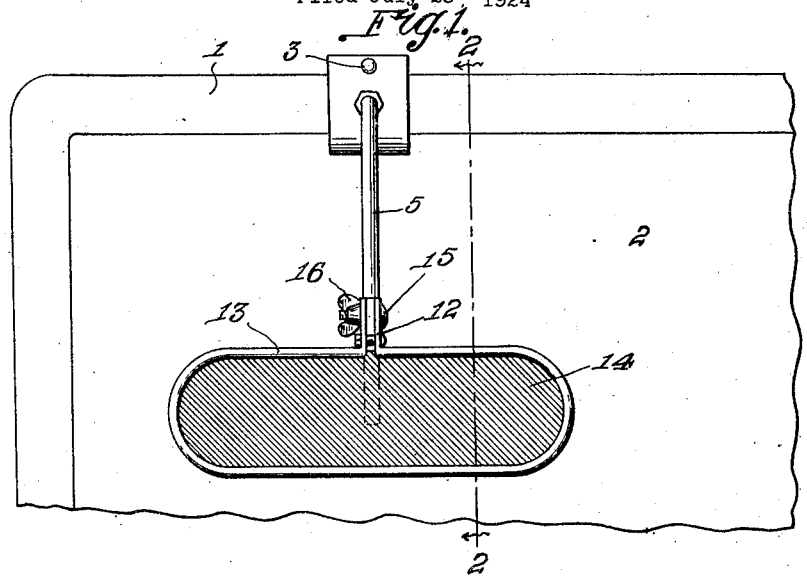
Figure 1 is an elevation illustrating the application of my improvement on the windshield of an automobile.
Figure 2:
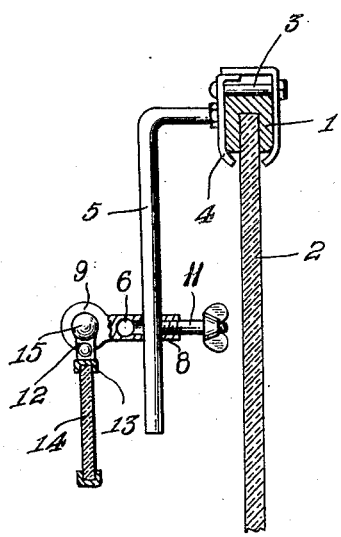
Figure 2 is a sectional view on the line 2—2 of Figure 1.

As disclosed in Figures 1 and 2 of the drawing, I employ a two part clamp which is arranged around the top of the frame 1 of a windshield 2 of an automobile. Removable and adjustable means 3 bind the clamp sections on the frame member 1. The inner clamp section, for distinction, is indicated by the numeral 4 and has secured thereto the angle end of a rod 5. The rod depends from the clamp and is passed through one of two rightangularly disposed openings 6 or 7 in the body portion 8 of a bracket 9. The bracket is provided with a threaded bore 10 that communicates with both of the openings 6 and 7, and in this bore there is screwed a binding bolt 11 that contacts with the rod 5 when the latter is passed through either of the openings 6 or 7.

The outer end of the bracket 9 is reduced and is centrally provided with an opening 11.

The reduced end is straddled by ears 12 on the ends of a split frame 13 carrying a glare shield 14. The ends 12 have aligning openings through which pass a blot 15 which is engaged by a wing nut 16.

By providing the bracket 9 with the openings 6 or 7 which pass through the bracket 9 at different angles, the post 5 may be attached to either the top or the side of the windshield frame. The glare shield 14 may be adjusted vertically on the rod and likewise may be swung on its connection with the bracket to any desired angle for protecting the eyes of the driver from glare of approaching automobile lights by night or the glare of the sun in day time. It is, of course, to be understood that the glare shield 14 is of translucent material.

Figure 3:
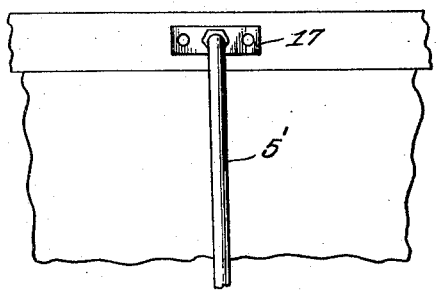
Figure 3 is a fragmentary elevation showing the supporting post for the glare shield fixedly secured to the front of a closed car.
Figure 4:
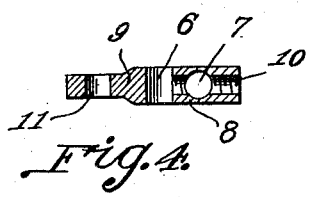
Figure 4 is a longitudinal sectional view through the adjustable bracket employed.

In Figure 3, the rod 5', has its angle end formed with or secured to a plate 17, and the said plate is screwed or otherwise fastened to the windshield frame.

Having described the invention, I claim:—

In a glare shield for automobiles, a right-angular post having one of its ends fixedly secured above the windshield of an automobile and its second arm extending downwardly therefrom, a bracket having a threaded bore entering from one end thereof, and having spaced openings therethrough arranged angularly with respect to each other and which intersect the threaded bore, the depending arm of the rod designed to be received through one of said openings, a binding screw threaded in the bore of the bracket for contacting the said arm of the rod, said bracket having its opposite end reduced and flattened and provided with a central transverse opening therethrough which is designed to be received between ears on a glare-shield supporting frame, in combination with binding means arranged between said ears and passing through the said opening in the end of the bracket.

In testimony whereof I affix my signature.

FRANK M. PRICE.